(12) United States Patent
Vedder et al.

(10) Patent No.: US 9,987,956 B2
(45) Date of Patent: Jun. 5, 2018

(54) LOCKING UNIT FOR A VEHICLE SEAT, AND VEHICLE SEAT

(71) Applicant: Johnson Controls GmbH, Burscheid (DE)

(72) Inventors: Andreas Vedder, Haan (DE); Ulrich Lehmann, Alfter (DE); Peter Mueller, Mackenbach (DE)

(73) Assignee: Johnson Controls GmbH, Burscheid (DE)

( * ) Notice: Subject to any disclaimer, the term of this patent is extended or adjusted under 35 U.S.C. 154(b) by 124 days.

(21) Appl. No.: 15/025,305

(22) PCT Filed: Sep. 23, 2014

(86) PCT No.: PCT/EP2014/070197
§ 371 (c)(1),
(2) Date: Mar. 28, 2016

(87) PCT Pub. No.: WO2015/044114
PCT Pub. Date: Apr. 2, 2015

(65) Prior Publication Data
US 2016/0229318 A1    Aug. 11, 2016

(30) Foreign Application Priority Data
Sep. 26, 2013   (DE) .................. 10 2013 219 409

(51) Int. Cl.
*B60N 2/36*  (2006.01)
*B60N 2/68*  (2006.01)
*B60N 2/015* (2006.01)
*F16B 5/04*  (2006.01)
*F16B 19/10* (2006.01)

(52) U.S. Cl.
CPC ......... *B60N 2/366* (2013.01); *B60N 2/01583* (2013.01); *B60N 2/682* (2013.01); *F16B 5/04* (2013.01); *F16B 19/10* (2013.01)

(58) Field of Classification Search
CPC .... B60N 2/366; B60N 2/01583; B60N 2/682; B60N 2002/447; B60N 2002/4475; B60N 2002/446
See application file for complete search history.

(56) References Cited

U.S. PATENT DOCUMENTS 3,426,375 A     2/1969  Jeal
3,823,440 A  *  7/1974  Klingelhofer ........ B60N 2/2252
                                                      16/276

(Continued)

FOREIGN PATENT DOCUMENTS

CH        422 482 A     10/1966
DE     102 27 089 A1    1/2004
(Continued)

Primary Examiner — Timothy J Brindley
(74) Attorney, Agent, or Firm — McGlew and Tuttle, P.C.

(57) ABSTRACT

A locking unit (10) for a vehicle seat (1) includes a housing with at least on side plate (16) and/or a cover plate (18), and at least one bearing bolt (51, 52) having a bearing axis (56). The at least one bearing bolt (51, 52), in an axial direction, is penetrated by a through opening (55) having a through axis (53). The through axis (53) of the through opening (55) extends offset to the bearing axis (56) of the bearing bolt (51, 52).

15 Claims, 5 Drawing Sheets

(56) References Cited

U.S. PATENT DOCUMENTS

| | | | | |
|---|---|---|---|---|
| 4,031,936 A | * | 6/1977 | Curtis | F16B 39/26 |
| | | | | 411/134 |
| 4,227,741 A | * | 10/1980 | Gross | B60N 2/2252 |
| | | | | 16/325 |
| 4,469,352 A | * | 9/1984 | Korner | B60R 22/201 |
| | | | | 280/801.2 |
| 4,557,631 A | * | 12/1985 | Donan, Jr. | E21D 21/008 |
| | | | | 405/259.3 |
| 5,205,609 A | * | 4/1993 | Notta | B60N 2/2352 |
| | | | | 297/362 |
| 6,994,496 B2 | * | 2/2006 | Mills | E21D 20/025 |
| | | | | 405/259.1 |
| 9,533,606 B2 | * | 1/2017 | Mueller | B60N 2/01583 |
| 2007/0241602 A1 | * | 10/2007 | Thiel | B60N 2/20 |
| | | | | 297/369 |
| 2011/0068185 A1 | * | 3/2011 | Bosterling | E01B 9/38 |
| | | | | 238/283 |
| 2013/0300174 A1 | * | 11/2013 | Ito | B60N 2/1615 |
| | | | | 297/354.1 |
| 2015/0329194 A1 | * | 11/2015 | Joern | B64C 1/1423 |
| | | | | 244/129.5 |
| 2015/0375637 A1 | * | 12/2015 | Kikuchi | B60N 2/12 |
| | | | | 297/317 |
| 2016/0121766 A1 | * | 5/2016 | Yokoyama | B60R 7/043 |
| | | | | 297/188.14 |
| 2016/0144748 A1 | * | 5/2016 | Akutsu | B60N 2/06 |
| | | | | 297/341 |
| 2017/0183903 A1 | * | 6/2017 | Schwendemann | E05F 15/63 |

FOREIGN PATENT DOCUMENTS

| | | |
|---|---|---|
| DE | 10 2008 051 832 A1 | 4/2010 |
| DE | 10 2009 041 848 A1 | 3/2011 |
| WO | 01/76907 A1 | 10/2001 |

* cited by examiner

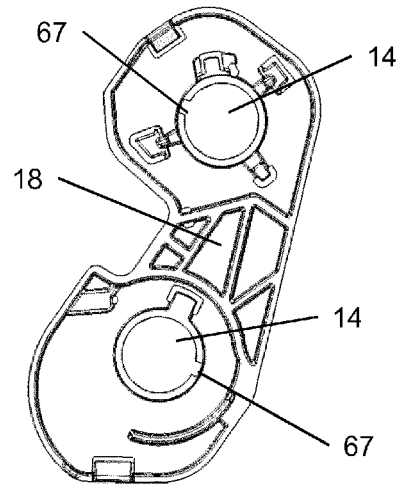 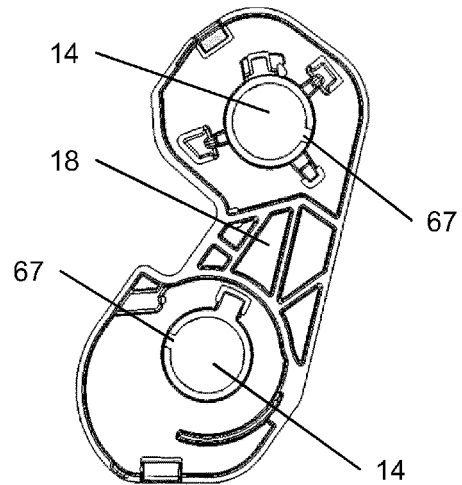
Fig. 9　　　　　　Fig. 10
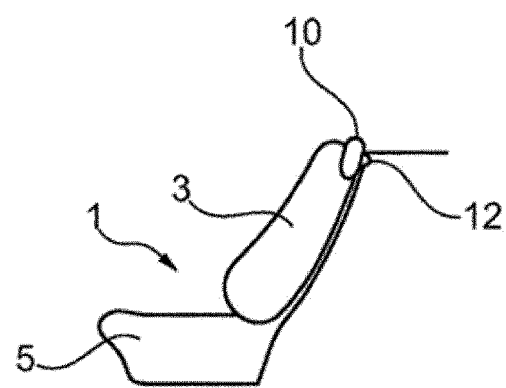
Fig. 11

LOCKING UNIT FOR A VEHICLE SEAT, AND VEHICLE SEAT

CROSS REFERENCE TO RELATED APPLICATIONS

This application is a U.S. National Phase Application of International Application PCT/EP2014/070197 filed Sep. 23, 2014 and claims the benefit of priority under 35 U.S.C. § 119 of German Patent Application 10 2013 219 409.9 filed Sep. 26, 2013 the entire contents of which are incorporated herein by reference.

FIELD OF THE INVENTION

The invention relates to a locking unit for a vehicle seat having a housing with at least one side plate and/or with at least one cover plate, and at least one bearing bolt having a bearing axis which, in the axial direction, is penetrated by a through-opening having a through-axis. The invention further relates to a vehicle seat having such locking unit.

BACKGROUND OF THE INVENTION

A generic locking unit for a vehicle seat is disclosed in DE 10 2008 051 832A1. Such a locking unit comprises a rotary catch pivotably mounted about a pivot axis, for locking to a locking pin. A latching pawl pivotably mounted about a further pivot axis secures the rotary catch in the locked state. A pivotably mounted clamping element denoted as a tolerance compensation pawl exerts a closing moment on the rotary catch and in this manner eliminates play which is present between the rotary catch and the locking pin.

The latching pawl and the clamping element are arranged pivotably about the same axis and axially offset adjacent to one another on a bearing bolt and cooperate with the rotary catch. The rotary catch is mounted on a different bearing bolt. The two bearing bolts are designed to be approximately hollow-cylindrical and arranged offset in parallel to one another. The central axes of the bearing bolts are aligned with said pivot axes. The bearing bolts are fastened to side parts of a housing of the locking unit.

The locking unit is fastened to the vehicle seat by means of screws which penetrate bearing bores of the side parts and the bearing bolts and are screwed into corresponding fastening bores on the structure of the vehicle seat. The central axes of the screws are aligned at the same time with the central axes of the bearing bolts and with the central axes of the fastening bores.

The spacing of the central axes of the fastening bores to one another is denoted as the pitch. So that the locking unit is able to be fastened to the vehicle seat, the spacing of the central axes of the bearing bolts to one another has to correspond to the pitch on the structure of the vehicle seat. If the locking unit is intended to be fastened to a different vehicle seat with a different pitch, the locking unit has to be adapted to this pitch.

SUMMARY OF THE INVENTION

An object of the invention is to improve a locking unit of the type mentioned in the introduction, in particular to permit an adaptation to different pitches.

A generic locking unit for a vehicle seat comprises a housing with at least one side plate and/or with at least one cover plate, and at least one bearing bolt having a bearing axis which, in the axial direction, is penetrated by a through-opening having a through-axis.

According to the invention it is provided in this case that the through-axis of the through-opening extends offset, in particular offset in the radial direction, to the bearing axis of the bearing bolt.

As a result, by a rotation of the bearing bolt about its bearing axis, an adaptation of the locking unit to different pitches may be achieved in a relatively simple manner. Thus, locking units with different pitches may be produced with substantially identical components. The cost of the production and storage of a plurality of different components for adapting the locking unit to different pitches is thus reduced.

Preferably, the through-axis extends parallel to the bearing axis and/or offset in parallel to the bearing axis. As a result, the through-opening is able to be introduced more easily in terms of production technology than if the through-opening were to extend inclined relative to the bearing axis.

Advantageously, the bearing bolt on the outside has a contour which is at least approximately rotationally symmetrical to its bearing axis. This permits a pivotable mounting of a component, in particular a rotary catch, a latching pawl or a clamping element on the bearing bolt.

Advantageously, the through-opening has a contour which is at least approximately rotationally symmetrical to its through-axis. As a result, the through-opening may receive a fastening means, for example a screw, the locking unit being able to be fastened thereby to a structural part.

Preferably, the through-opening has a circular cylindrical contour, which is able to be produced relatively easily in terms of production technology by introducing a bore.

The production of the locking unit is simplified and the strength increased if the bearing bolt is inserted into a first bearing bore of the side plate and/or into a second bearing bore of the cover plate.

Preferably, the locking unit comprises two bearing bolts, wherein each bearing bolt is inserted into a first bearing bore of the side plate and into a second bearing bore of the cover plate.

According to a preferred embodiment, the side plate consists at least primarily of metal, whereby the strength of the locking device is increased.

According to an advantageous development of the invention, the side plate on the edge of the first bearing bore has at least one press-fit region, material of the bearing bolt passing therein by means of compression. Therefore, a stepless adaptation to a pitch is possible by a rotational alignment of the bearing bolt in the first bearing bore. By means of the subsequent compression, a fixing of the bearing bolt to the side plate takes place and thus an adjustment to the pitch.

According to a development of the invention, the side plate preferably has a plurality of press-fit regions on the edge of the first bearing bore. In this case, it may be advantageous if each press-fit region has the maximum spacing from the respectively adjacent press-fit region.

According to a further preferred embodiment, the plurality of press-fit regions is uniformly distributed along the edge of the first bearing bore.

According to a preferred embodiment, the cover plate consists at least primarily of plastics material, whereby the weight of the locking device is reduced.

According to a further advantageous development of the invention, the cover plate on the edge of the second bearing bore has at least one groove, a stud of the bearing bolt engaging therein. By selecting the position of the groove during the production of the cover plate, the pitch is able to be predetermined thereby. A faulty manufacture of the locking unit caused by a faulty alignment of the bearing bolt in the second bearing bore is thereby excluded.

The invention is described in more detail hereinafter with reference to an advantageous exemplary embodiment shown in the drawings, as well as a modification of the exemplary embodiment. However, the invention is not limited to this exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiment of the invention is illustrated.

BRIEF DESCRIPTION OF THE DRAWINGS

In the drawings:
FIG. 9 is an enlarged view of a cover plate for receiving two bearing bolts according to the modification according to FIG. 8 with an adaptation to a minimum pitch;
FIG. 10 is an enlarged view of a cover plate for receiving two bearing bolts according to the modification according to FIG. 8 with an adaptation to a maximum pitch;
and
FIG. 11 is a schematic view of a vehicle seat.

DESCRIPTION OF THE PREFERRED EMBODIMENTS

Figure 1:
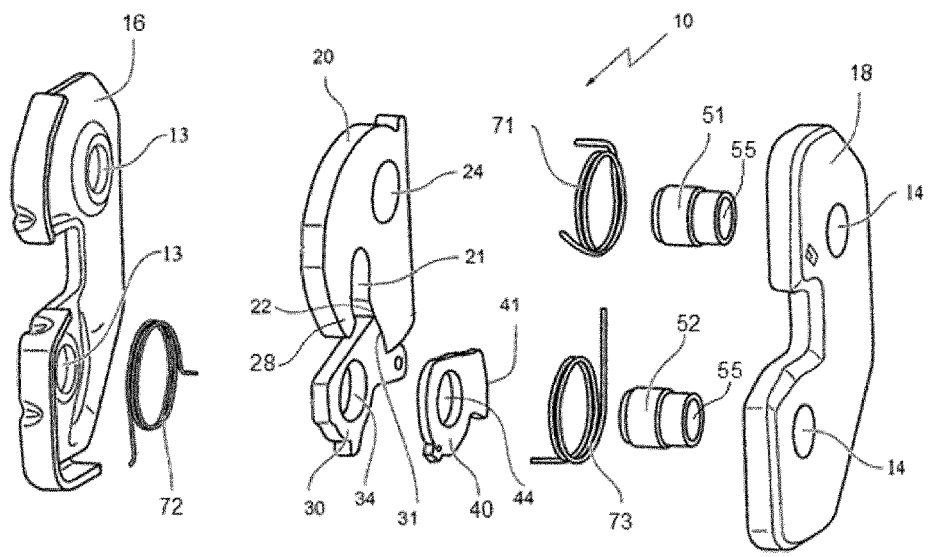
FIG. 1 is an exploded view of a generic locking unit according to the prior art.

In a motor vehicle, a locking unit 10 is provided for attaching a backrest 3 of a vehicle seat 1, in particular a backseat, to a vehicle structure. The backrest 3 in this case is pivotably attached to a seat part 5 from a position of use into a position of non-use.

The locking unit 10, however, is also able to be used in different positions, for example for fastening the seat part 5 of the vehicle seat 1 to the floor structure of the motor vehicle or in a door lock.

The arrangement of the vehicle seat 1 inside the vehicle and the usual direction of travel thereof define the directional information used hereinafter. In this case, a direction oriented perpendicular to the ground is denoted hereinafter as the vertical direction and a direction perpendicular to the vertical direction and perpendicular to the direction of travel is denoted hereinafter as the transverse direction.

The locking unit 10 has a lock housing which comprises a side plate 16 and a cover plate 18. The bottom surfaces of the side plate 16 and the cover plate 18 are in the present case of planar configuration and arranged in a plane defined by the direction of travel and the vertical direction, i.e. perpendicular to the transverse direction. The side plate 16 comprises two first bearing bores 13 designed in the present case as circular. The cover plate 18 comprises two second bearing bores 14, designed in the present case as circular.

The side plate 16 and the cover plate 18 form a receiver opening which opens in the direction of a locking pin 12, in order to receive said locking pin for locking Here, the locking unit 10 is fastened in the present case to the backrest 3 and the locking pin 12 is fastened to the vehicle structure. It is also conceivable that the locking unit 10 is fastened to the vehicle structure and the locking pin 12 is fastened to the backrest 3. The portion of the locking pin 12 receiving the receiver opening extends generally horizontally in the transverse direction.

A rotary catch 20 is pivotably mounted on a first bearing bolt 51, which in turn is fastened to the side plate 16 and to the cover plate 18. To this end, the rotary catch 20 has a rotary catch hole 24 which is penetrated by the first bearing bolt 51. The rotary catch 20 further comprises a hook mouth 21 for cooperation with the locking pin 12. By means of a first spring 71, the rotary catch 20 is pretensioned in the opening direction.

The rotary catch 20 has a functional surface 22 which partially defines the hook mouth 21 to the side. In the locked state the functional surface 22 approximately faces in the direction of a second bearing bolt 52 which is arranged parallel to the first bearing bolt 51 and thus also extends in the transverse direction. The functional surface 22 in the present case is configured to be planar but may, for example, also be curved in the shape of a circular arc and may be of concave configuration.

On the side of the hook mouth 21 remote from the rotary catch hole 24, opposing the functional surface 22, the hook mouth 21 is defined to the side by a nose 28 of the rotary catch 20. The rotary catch 20 has a base body which is defined in the axial direction by one respective planar bottom surface. The width of the functional surface 22 corresponds to the thickness of the base body of the rotary catch 20, i.e. to the extent of the base body in the axial direction.

The first bearing bolt 51 is inserted into a first bearing bore 13 of the side plate 16 and into a second bearing bore 14 of the cover plate 18, and protrudes perpendicular from the bottom surfaces of the side plate 16 and the cover plate 18. The first bearing bolt 51 extends, therefore, horizontally in the transverse direction. The first bearing bolt 51 has a through-opening 55 with an approximately constant internal diameter.

Also, the second bearing bolt 52 is inserted into one respective first bearing bore 13 of the side plate 16 and into a second bearing bore 14 of the cover plate 18 and protrudes perpendicular from the bottom surfaces of the side plate 16 and the cover plate 18. The second bearing bolt 52 thus also extends horizontally in the transverse direction. The second bearing bolt 52 has, as in the case of the first bearing bolt 51, a through-opening 55 with an approximately constant internal diameter.

The through-openings 55 of the bearing bolts 51, 52 serve to receive a fastening means, for example a screw, the locking unit 10 being fastened thereby when mounted on the backrest 3 or on a further structural part of the vehicle seat 1 or the vehicle. To this end, the screws are screwed into fastening bores in the structural part. The spacing of the central axes of the fastening bores to one another defines a pitch of the structural part.

In the present case, the first bearing bolt 51 and the second bearing bolt 52 consist of a metal, the side plate 16 also consists in the present case of a metal, and the cover plate 18 consists in the present case of a plastics material.

A clamping element 40 is pivotably mounted on the second bearing bolt 52. To this end, the clamping element 40 has a clamping element hole 44 which is circular in the present case and which is penetrated by the second bearing bolt 52. By means of a third spring 73, the clamping element 40 is pretensioned toward the rotary catch 20.

In the locked state, if the hook mouth 21 of the rotary catch 20 receives the locking pin 12, the clamping element 40 exerts a closing moment on the rotary catch 20, due to the pretensioning by the third spring 73 as securing element. To this end, the clamping element 40 has a clamping surface 41 which is curved eccentrically relative to the second bearing bolt 52 and which is in non-self-locking contact with the functional surface 22 of the rotary catch 20. The clamping surface 41 in the present case is curved in the shape of a circular arc and is of convex configuration.

A latching pawl 30 is arranged on the second bearing bolt 52, axially adjacent to the clamping element 40 and also pivotably mounted on the second bearing bolt 52, i.e. aligned with the clamping element 40. To this end, the latching pawl 30 has a latching pawl hole 34 which is circular in the present case and which is penetrated by the second bearing bolt 52. By means of a second spring 72, the latching pawl 30 is pretensioned toward the rotary catch 20.

The latching pawl 30 in the present case is arranged adjacent to the side plate 16 and the clamping element 40 in the present case is arranged adjacent to the cover plate 18. The latching pawl 30 and the clamping element 40 are coupled for entrainment with free travel, for example by means of a slot-pin guide or by means of an axially protruding drive element.

The latching pawl 30 has a latching surface 31 which is located in the vicinity of the clamping surface 41 of the clamping element 40. In the locked state, the latching surface 31 is positioned spaced apart from the functional surface 22 of the rotary catch 20. The latching surface 31 in the present case is curved in the shape of a circular arc and is of convex configuration, but may also be planar.

The width of the functional surface 22, which corresponds to the thickness of the base body of the rotary catch 20, also approximately corresponds to the sum of the thickness of the latching pawl 30 and the thickness of the clamping element 40. The rotary catch 20 thus has approximately the same material thickness as the latching pawl 30 and the clamping element 40 together.

In the locked state of the locking unit 10 the locking pin 12 is located in the receiver opening formed by the side plate 16 and the cover plate 18 and in the hook mouth 21 of the closed rotary catch 20. The clamping element 40 secures the rotary catch 20 by the cooperation of the clamping surface 41 with the cam 26. The latching surface 31 of the latching pawl 30 is slightly spaced apart from the functional surface 22 of the rotary catch 20.

For opening the locking unit 10 the latching pawl 30 is pivoted away from the rotary catch 20, whereby the latching surface 31 of the latching pawl 30 is moved further away from the functional surface 22 of the rotary catch 20. The latching pawl 30 entrains the clamping element 40 due to the coupling in entrainment so that the rotary catch 20 is no longer secured.

By means of the pretensioning due to the first spring 71 the rotary catch 20 opens, and thus pivots in the opening direction. Alternatively or additionally to the pretensioning by the first spring 71, the rotary catch 20 may also be entrained for opening by the latching pawl 30 or by the clamping element 40.

Due to the pivoting movement of the rotary catch 20 the hook mouth 21 is pulled back from the receiver opening formed by the side plate 16 and the cover plate 18, and releases the locking pin 12 which moves counter to the pivoting-in direction away from the locking unit 10. If the locking pin 12 has left the hook mouth 12, the locking unit 10 is thus in the unlocked state.

If in this unlocked state the locking pin 12 again enters the receiver opening formed by the side plate 16 and the cover plate 18, and comes to bear against the edge of the hook mouth 21, the locking pin 12 presses the rotary catch 20 into its closed position. The clamping element 40 moves along the cam 26 due to its pretensioning by the third spring 73. Entrained by the clamping element 40 or due to the pretensioning by the second spring 72, the latching pawl 30 pivots onto the rotary catch 20, wherein the latching surface 31 approaches the functional surface 22 of the rotary catch 20. Subsequently, the locking unit 10 is once again in the locked state.

Figure 2:
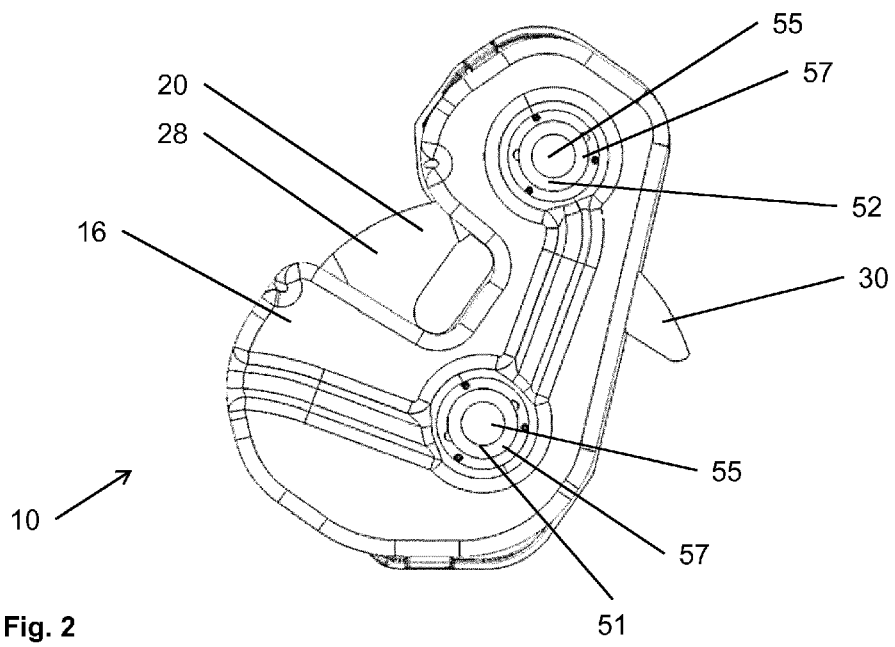
FIG. 2 is a side view of a generic locking unit according to the prior art.

In the locking unit 10 shown in FIG. 1 and FIG. 2, according to the prior art, the bearing bolts 51, 52 on the outside in the axial direction have a rotationally symmetrical contour relative to their central axis and two front faces 57 in the radial direction. The cylindrical through-opening 55 is located centrally in each of the bearing bolts 51, 52. The central axis of the through-opening 55 is thus aligned with the central axis of the bearing bolt 51, 52. The front faces 57 of the bearing bolt 51, 52 in each case have the shape of a circular ring. The spacing of the central axes of the first bearing bolt 51 and the second bearing bolt 52 to one another thus corresponds to the pitch of the structural part.

In the locking unit 10 according to the invention, the bearing bolts 51, 52 also have on the outside an at least approximately rotationally symmetrical contour which is denoted hereinafter as the bearing axis 56, as well as two front faces 57. The cylindrical through-opening 55, however, is located eccentrically in each of the bearing bolts 51, 52. The central axis of the through-opening 55, which is denoted hereinafter as the through-axis 53, thus extends offset in parallel to the bearing axis 56 of the bearing bolt 51, 52. The front faces 57 of the bearing bolt 51, 52 in each case have a shape which deviates from the shape of a circular ring.

The bearing axis 56 defines an axial direction which in the present case corresponds to the transverse direction.

The spacing of the through-axis 53 of the through-opening 55 of the first bearing bolt 51 to the through-axis 53 of the through-opening 55 of the second bearing bolt 52 corresponds to the pitch of the structural part.

By a rotation of the first bearing bolt 51 and/or the second bearing bolt 52 about its bearing axis 56 relative to the side plate 16 and to the cover plate 18, a rotation also takes place of the respective through-opening 55 about the bearing axis 56 of the respective bearing bolt 51, 52. In this case, the through-axis 53 of the respective through-opening 55 is also displaced. As a result, the spacing of the through-axis 53 of the through-opening 55 of the first bearing bolt 51 is altered relative to the through-axis 53 of the through-opening 55 of the second bearing bolt 52.

By a rotation of the first bearing bolt 51 and/or the second bearing bolt 52 about its bearing axis 56 relative to the side plate 16 and relative to the cover plate 18, the spacing of the through-axes 53 of the through-openings 55 of the bearing bolts 51, 52 to one another is able to be altered. As a result, an adaptation of the locking unit 10 to different pitches of a plurality of structural parts is possible.

Figure 3:
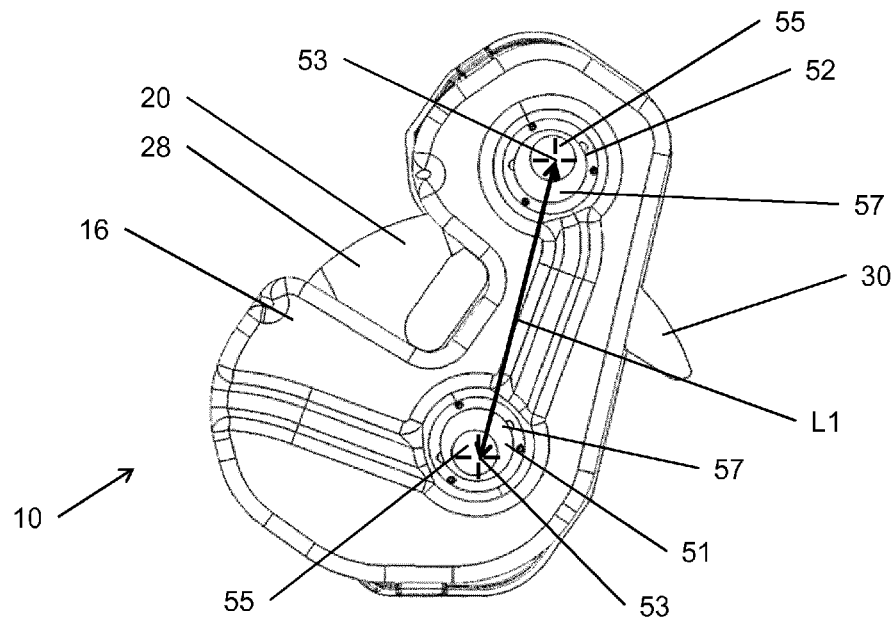
FIG. 3 is a side view of a locking unit according to the invention with an adaptation to a maximum pitch.

In the view shown in FIG. 3, the bearing bolts 51, 52 are rotated such that the spacing of the through-axes 53 of the through-openings 55 to one another is at a maximum. Thus, the locking unit is adapted to a maximum pitch L1.

The through-axis 53 of the through-opening 55 of the first bearing bolt 51 in this case is located on the side of the bearing axis 56 of the first bearing bolt 51 remote from the second bearing bolt 52. The through-axis 53 of the through-opening 55 of the second bearing bolt 52 in this case is located on the side of the bearing axis 56 of the second bearing bolt 52 remote from the first bearing bolt 51. The through-axes 53 of the through-openings 55 and the bearing axes 56 of the bearing bolts 51, 52 are located in this case in one plane.

Figure 4:
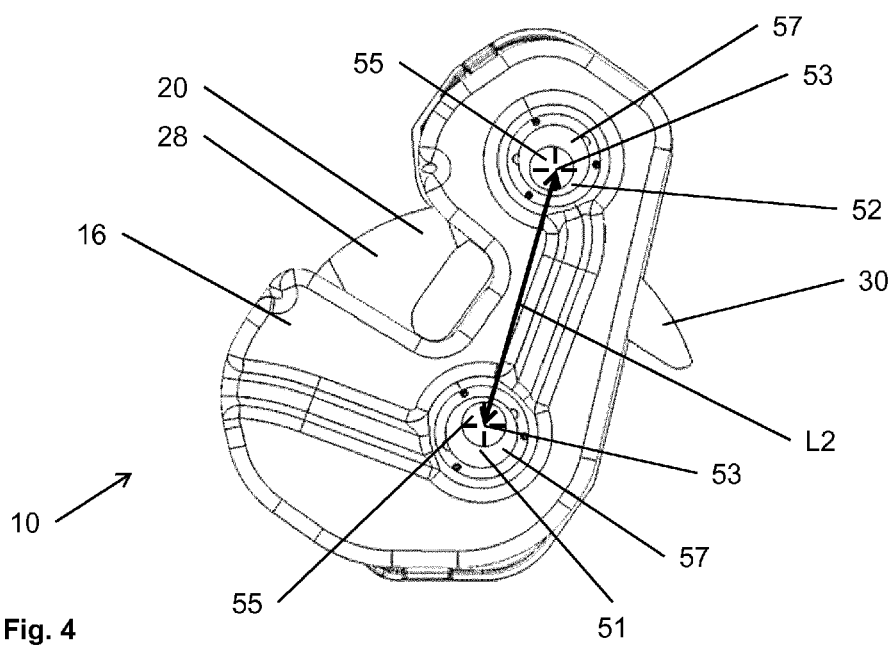
FIG. 4 is a side view of a locking unit according to the invention with an adaptation to a minimum pitch.
Figure 5:
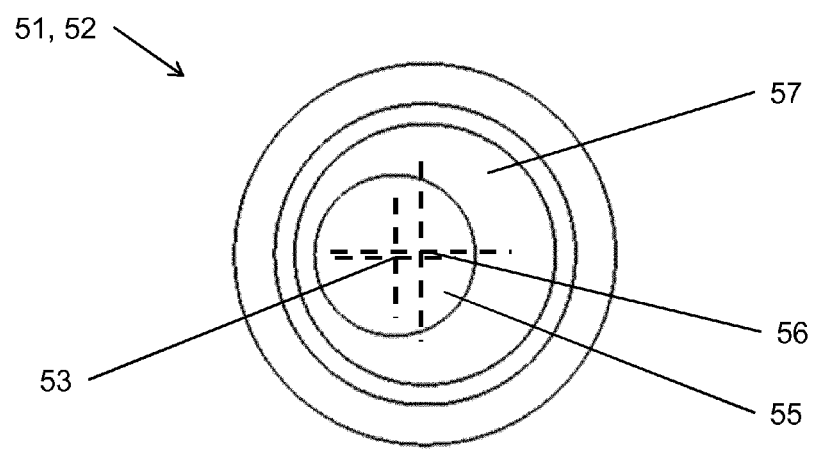
FIG. 5 is a plan view of a bearing bolt of a locking unit according to the invention.
Figure 6:
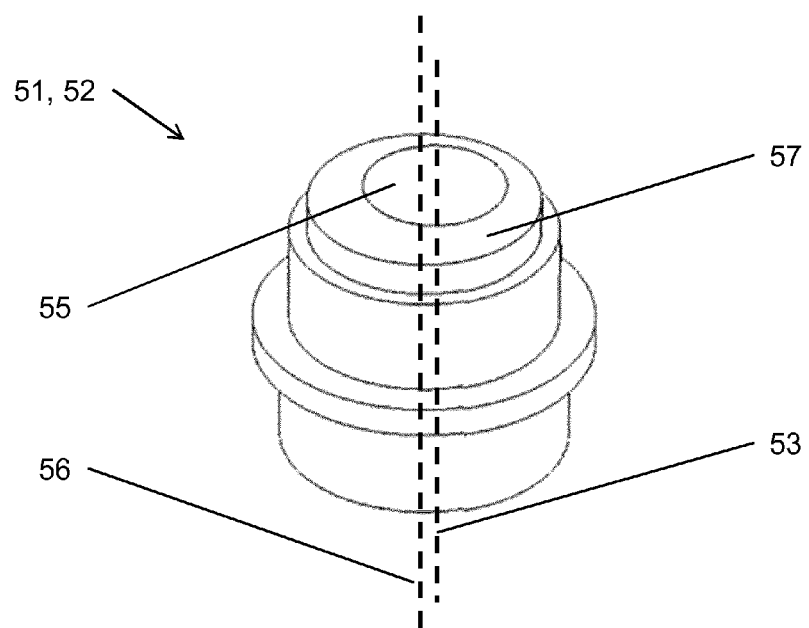
FIG. 6 is a perspective view of the bearing bolt according to FIG. 5.

In the view shown in FIG. 4, the bearing bolts 51, 52 are rotated such that the spacing of the through-axes 53 of the through-openings 55 to one another is at a minimum. Thus, the locking unit is adapted to a minimum pitch L2.

The through-axis 53 of the through-opening 55 of the first bearing bolt 51 in this case is located on the side of the bearing axis 56 of the first bearing bolt 51 facing the second bearing bolt 52. The through-axis 53 of the through-opening 55 of the second bearing bolt 52 in this case is located on the side of the bearing axis 56 of the second bearing bolt 52 facing the first bearing bolt 51. The through-axes 53 of the through-openings 55 and the bearing axis 56 of the bearing bolts 51, 52 in this case are also located in one plane.

By a rotation of the first bearing bolt 51 and/or of the second bearing bolt 52 about its bearing axis 56, therefore, a stepless adaptation of the locking unit 10 to any pitch between the maximum pitch L1 and the minimum pitch L2 is possible.

When producing the locking unit 10 the bearing bolts 51, 52 are positioned in the housing of the locking unit 10 and in this case partially inserted into the first bearing bores 13 of the side plate 16 and into the second bearing bores 14 of the cover plate 18. Subsequently, the required pitch is set by rotating the bearing bolts 51, 52 about their bearing axis 56 relative to the side plate 16 and the cover plate 18.

In a plurality of positions, in the present case two respective positions, on the edge of the first bearing bores 13, press-fit regions 61 are provided in the side plate 16. Each press-fit region 61 has the shape of an approximately semi-circular recess made of the material of the side plate 16, which extends radially outwardly from the edge of the first bearing bore 13.

Figure 7:
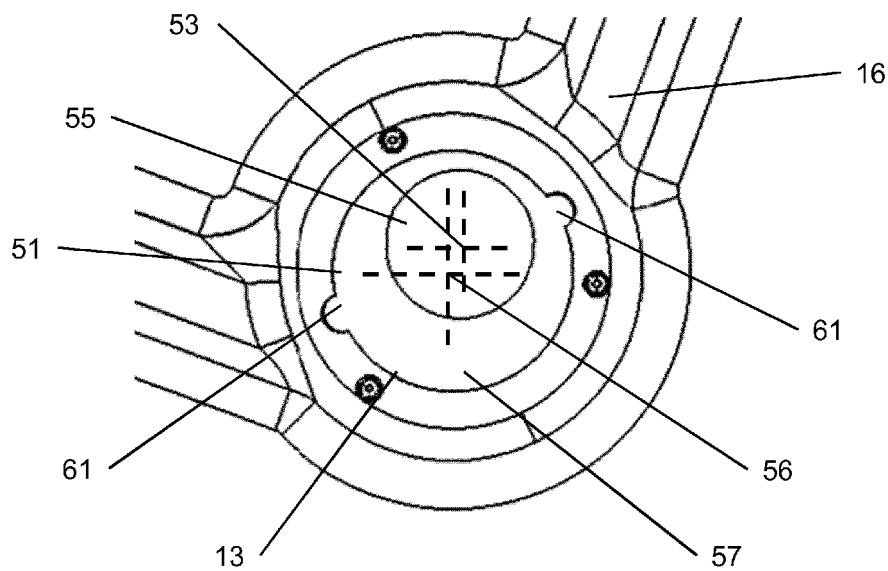
FIG. 7 is an enlarged view of a side plate with the bearing bolt pressed-in according to FIG. 6.

By means of compression, the bearing bolts 51, 52 are fastened to the housing of the locking unit 10. In this case, a corresponding punch is pushed onto the front face 57 of the bearing bolt 51, whereupon material of the bearing bolt 51 passes into the press-fit regions 61. Such a pressed-in first bearing bolt 51 is shown in FIG. 7. As a result, the bearing bolt 51, 52 is positively fixed in the side plate 16. A rotation of the bearing bolt 51, 52 about its bearing axis 56 is thus prevented. Thus, a fixed pitch is set on the locking unit 10.

Figure 8:
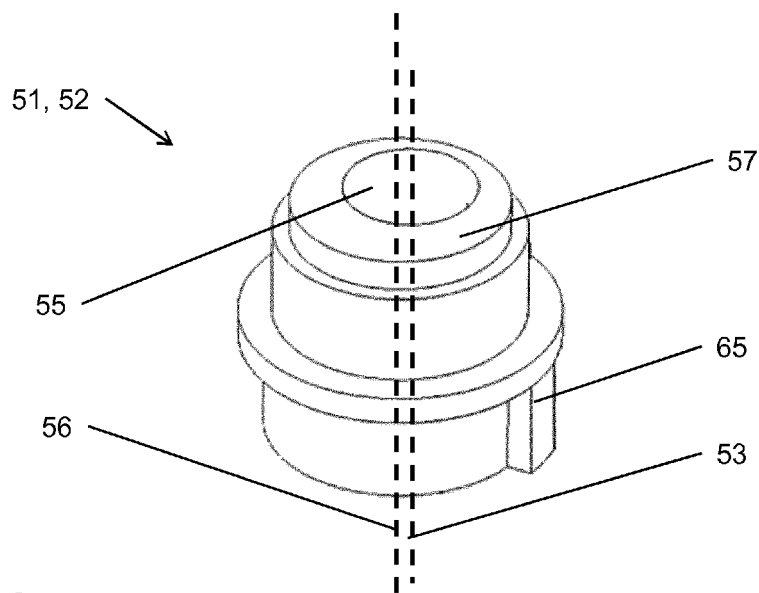
FIG. 8 is a perspective view of the bearing bolt according to FIG. 5 according to a modification.

According to a modification of the exemplary embodiment, the bearing bolt 51, 52, as shown in FIG. 8, has a stud 65 on a part of its outer surface. The stud 65 has an approximately cuboidal shape with an approximately rectangular cross section. The stud 65 extends, starting on a front face 57, in the axial direction parallel to the bearing axis 56. In the view according to FIG. 8, said front face 57 opposes the visible front face 57 and is not visible.

According to the modification of the exemplary embodiment, one respective groove 67 is provided in the cover plate 18 at a point on the edge of the second bearing bores 14. Each groove 67 has the shape of an approximately rectangular recess made of the material of the cover plate 18 which extends radially outwardly from the edge of the second bearing bore 14.

According to the modification of the exemplary embodiment, during production of the locking unit 10 the bearing bolts 51, 52 are positioned in the housing of the locking unit 10, wherein the studs 65 of the cover plate 18 face one another. In this case, the bearing bolts 51, 52 are partially inserted into the first bearing bores 13 of the side plate 16 and into the second bearing bores 14 of the cover plate 18. In this case, the bearing bolts 51, 52 are aligned such that their studs 65 in each case engage in a groove 67 in the cover plate 18. As a result, the bearing bolts 51, 52 are positively fixed in the cover plate 16. A rotation of the bearing bolts 51, 52 about their bearing axes 56 is thus prevented. Thus, a fixed pitch is set on the locking unit 10.

According to the modification of the exemplary embodiment, the required pitch is able to be predetermined by the position of the grooves 67 in the cover plate 18. In FIG. 9, a cover plate 18 is shown for a locking unit 10 with minimum pitch. In FIG. 10, a cover plate 18 for a locking unit 10 with maximum pitch is shown. Therefore, a specific cover plate 18 has to be provided for each required pitch.

The features disclosed in the above description, the claims and the drawings may be of significance both individually and in combination for the implementation of the invention in the various embodiments thereof.

While specific embodiments of the invention have been shown and described in detail to illustrate the application of the principles of the invention, it will be understood that the invention may be embodied otherwise without departing from such principles.

The invention claimed is:

1. A locking unit for a vehicle seat, the locking unit comprising:
   a housing comprising at least one plate; and
   at least one bearing bolt having a bearing axis which, in the axial direction, is penetrated by a through-opening having a through-axis, wherein the through-axis of the through-opening extends offset to the bearing axis of the bearing bolt, wherein the bearing bolt is inserted into at least a bearing bore of the at least one plate, wherein the plate on the edge of the bearing bore has at least one press-fit region, material of the bearing bolt passing therein by means of compression.

2. The locking unit as claimed in claim 1, wherein the through-axis extends parallel to the bearing axis.

3. The locking unit as claimed in claim 1, wherein the bearing bolt, on a bearing bolt outside, has a contour which is at least approximately rotationally symmetrical to the bearing axis.

4. The locking unit as claimed in claim 1, wherein the through-opening has a contour which is at least approximately rotationally symmetrical to the through-axis.

5. The locking unit as claimed in claim 4, wherein the through-opening has a circular cylindrical contour.

6. The locking unit as claimed in claim 1, wherein the at least one plate is comprised primarily of metal.

7. The locking unit as claimed in claim 1, wherein the at least one plate on the edge of the bearing bore has a plurality of press-fit regions.

8. The locking unit as claimed in claim 7, wherein each press-fit region has the maximum spacing from the respectively adjacent press-fit region.

9. The locking unit as claimed in claim 1, wherein a plurality of press-fit regions are uniformly distributed along the edge of the bearing bore.

10. The locking unit as claimed in claim 1, wherein the housing comprises a cover plate, the cover plate being comprised primarily of plastics material.

11. The locking unit as claimed in claim 1, wherein the housing comprises a cover plate, the cover plate on the edge of a second bearing bore has at least one groove, a stud of the bearing bolt engaging therein.

12. A vehicle seat comprising at least one locking unit, the locking unit comprising:
- a housing comprising at least one plate; and
- at least one bearing bolt having a bearing axis which, in the axial direction, is penetrated by a through-opening having a through-axis, wherein the through-axis of the through-opening extends offset to the bearing axis of the bearing bolt, wherein the bearing bolt is inserted into at least a plate bearing bore, wherein the at least one plate is comprised primarily of metal, wherein the at least one plate comprises a press-fit region on an edge of the plate bearing bore such that the bearing bolt passing therein by means of compression.

13. A vehicle seat as claimed in claim 12, wherein:
the through-axis extends parallel to the bearing axis; and
the bearing bolt has a bearing bolt outside with a contour which is at least approximately rotationally symmetrical to the bearing axis;
a through-opening
the through-opening has a contour which is at least approximately rotationally symmetrical to the through-axis.

14. A vehicle seat as claimed in claim 12, wherein:
the at least one plate comprises at least another press-fit region on an edge of the plate bearing bore the side plate to provide a plurality of press-fit regions;
each press-fit region has a maximum spacing from an adjacent press-fit region;
each of the plurality of press-fit regions is uniformly distributed along the edge of the plate bearing bore.

15. A vehicle seat as claimed in claim 12, wherein:
the housing comprises a cover plate;
the cover plate is comprised primarily of plastics material;
on an edge of a cover plate bearing bore the cover plate has at least one groove; and
a stud of the bearing bolt engages in the at least one groove.

* * * * *